US011297462B2

(12) United States Patent
Hanna et al.

(10) Patent No.: US 11,297,462 B2
(45) Date of Patent: Apr. 5, 2022

(54) SYSTEMS AND METHODS FOR OPTIMIZING FLEET MANAGEMENT AND PRODUCTION MANAGEMENT USING MOBILE GEOFENCES

(71) Applicant: Foresight Intelligence Inc., Scottsdale, AZ (US)

(72) Inventors: Dale Hanna, Scottsdale, AZ (US); Daniel Schaefer, Scottsdale, AZ (US)

(73) Assignee: Foresight Intelligence Inc., Scottsdale, AZ (US)

( * ) Notice: Subject to any disclaimer, the term of this patent is extended or adjusted under 35 U.S.C. 154(b) by 0 days.

(21) Appl. No.: 17/038,405

(22) Filed: Sep. 30, 2020

(65) Prior Publication Data
US 2021/0099828 A1     Apr. 1, 2021

Related U.S. Application Data

(60) Provisional application No. 62/908,411, filed on Sep. 30, 2019.

(51) Int. Cl.
*H04W 4/021*     (2018.01)
*H04W 4/029*     (2018.01)

(52) U.S. Cl.
CPC .......... *H04W 4/021* (2013.01); *H04W 4/029* (2018.02)

(58) Field of Classification Search
CPC ... H04W 4/021; H04W 68/00; H04W 64/003; H04W 4/80; H04W 4/029; H04W 12/63; H04W 4/70; H04W 4/44; H04W 4/20; H04W 4/40; H04W 12/086; H04W 4/02; H04W 4/21; H04W 52/0254; H04L 61/609; H04L 12/2816; H04L 67/18;
(Continued)

(56) References Cited

U.S. PATENT DOCUMENTS

| 6,496,775 B2 | 12/2002 | McDonald, Jr. et al. |
| 6,611,755 B1 | 8/2003 | Coffee et al. |
| 6,917,300 B2 | 7/2005 | Allen |

(Continued)

FOREIGN PATENT DOCUMENTS

| CN | 1464348 A | 12/2003 |
| DE | 69636700 T2 | 10/2007 |

(Continued)

*Primary Examiner* — Srilakshmi K Kumar
*Assistant Examiner* — Jing Gao
(74) *Attorney, Agent, or Firm* — Peacock Law P.C.; Justin R. Muehlmeyer; Deborah A. Peacock

(57) ABSTRACT

Systems, devices and methods for managing mobile assets at a worksite. A system computer creates a geofence relating to the geolocation of a first communication device disposed in a first mobile asset, the data points of the geofence periodically updated according to the geolocation of the first communication device such that changes in the geolocation of the first communication device are proportionally reflected in the updated geolocation of the datapoints of the geofence. The cycle time of a second communication device disposed in a second mobile asset can be determined by determining the amount of time lapsed after the second communication device triggers the geofence. Various triggering events are described. Various shapes of the geofence are described to avoid unintended triggers of the geofence by assets, including polygonal shapes.

20 Claims, 8 Drawing Sheets

(58) Field of Classification Search
CPC ....... H04L 67/104; H04L 67/22; G06F 16/29; G06F 2221/2111; G06F 3/04815; G06F 1/3206
See application file for complete search history.

(56) References Cited

U.S. PATENT DOCUMENTS

| | | |
|---|---|---|
| 8,591,146 B2 | 11/2013 | Begley et al. |
| 9,298,803 B2 | 3/2016 | Wallace |
| 2009/0140886 A1 | 6/2009 | Bender |
| 2011/0077827 A1 | 3/2011 | Arshad et al. |
| 2012/0242470 A1 | 9/2012 | Morgan et al. |
| 2012/0259537 A1* | 10/2012 | Schmidt ................ H04W 4/021 701/300 |
| 2013/0099977 A1* | 4/2013 | Sheshadri ............. H04W 4/021 342/450 |
| 2015/0077276 A1 | 3/2015 | Mitchell et al. |
| 2016/0066146 A1 | 3/2016 | Jernigan |
| 2018/0107979 A1* | 4/2018 | Westover ......... G06Q 10/08355 |

FOREIGN PATENT DOCUMENTS

| | | |
|---|---|---|
| JP | 2012226746 A | 11/2012 |
| WO | 2013058954 A1 | 4/2013 |
| WO | 2018138310 A1 | 8/2018 |

\* cited by examiner

| Asset Name | Make | Model | Asset type | Jobsite | Jobsite Type | Date | Load Count | Dump Count | Total Transit | Avg Transit | Total Site Time | Avg Site Time |
|---|---|---|---|---|---|---|---|---|---|---|---|---|
| 558RT | CAT | 773B | Truck-Rock | Pit Loader 28 | Loading | 3/16/19 | 27 | | 1:14:15 | 0:02:45 | 1:39:00 | 0:03:40 |
| 558RT | CAT | 773B | Truck-Rock | Glendale Primary Crusher | Dumping | 3/16/19 | | 27 | 1:32:15 | 0:03:25 | 1:27:45 | 0:03:15 |
| 558RT | CAT | 773B | Truck-Rock | Pit Loader 28 | Loading | 3/18/19 | 33 | | 1:33:30 | 0:02:50 | 2:06:30 | 0:03:50 |
| 558RT | CAT | 773B | Truck-Rock | Glendale Primary Crusher | Dumping | 3/18/19 | | 33 | 1:55:30 | 0:03:30 | 1:39:00 | 0:03:00 |
| 558RT | CAT | 773B | Truck-Rock | Pit Loader 28 | Loading | 3/19/19 | 48 | | 2:28:00 | 0:03:05 | 2:44:00 | 0:03:25 |
| 558RT | CAT | 773B | Truck-Rock | Glendale Primary Crusher | Dumping | 3/19/19 | | 48 | 2:52:00 | 0:03:35 | 2:36:00 | 0:03:15 |
| 558RT | CAT | 773B | Truck-Rock | Pit Loader 28 | Loading | 3/20/19 | 41 | | 2:13:15 | 0:03:15 | 2:37:10 | 0:03:50 |
| 558RT | CAT | 773B | Truck-Rock | Glendale Primary Crusher | Dumping | 3/20/19 | | 41 | 2:30:20 | 0:03:40 | 1:59:35 | 0:02:55 |

FIG. 6B

SYSTEMS AND METHODS FOR OPTIMIZING FLEET MANAGEMENT AND PRODUCTION MANAGEMENT USING MOBILE GEOFENCES

CROSS-REFERENCE TO RELATED APPLICATIONS

This application claims priority to and the benefit of the filing of U.S. Provisional Patent Application No. 62/908, 411, entitled "Method for Optimizing Fleet Management Productivity Using Mobile Geofences", filed on Sep. 30, 2019, and the specification thereof is incorporated herein by reference.

BACKGROUND OF THE INVENTION

Field of the Invention

Embodiments of the present invention relate to tracking mobile and stationary objects relative to each other using geolocation data, and more particularly to generating a geofence related to the geolocation of a mobile asset.

Background Art

GPS, which stands for Global Positioning System, is a navigational system using satellite signals to determine the location of a receiver on or above the earth's surface. At least 24 GPS satellites are in orbit above the earth, each transmitting its position and the time to all receivers within line of sight. The satellites are spaced so that from any point on earth, four satellites will be above the horizon. On the ground, a GPS receiver receives the signals from the satellites and can calculate the geographic position in latitude and longitude. Often the receiver is inside a mobile phone.

User accuracy refers to how close the receiver's calculated position is from the actual position, expressed as a radius. The user accuracy of today's GPS depends on a number of variables, but generally provides a 68% confidence interval that the location is within 10 meters of the determined coordinates. For example, GPS enabled smartphones are typically accurate to within a 4.9 m (16 ft.) radius under open sky.

A geofence is a virtual perimeter for a real-world geographic area. Geofencing allows users to set geographic boundaries around land zones or around point locations. For example, a geofence can be set as the perimeter of a school zone or around a point of interest such as a historical monument. Men the geofence perimeter is crossed by a GPS-enabled device, an alert can be sent to the user or operator via SMS text, email, or within an application on a mobile device.

Geofencing is often used to monitor information relating to an individual asset or an entire fleet of assets. Such systems are sometimes called "telematics" systems. Telematics systems gather data regarding the location of an asset, driver/operator behavior, engine diagnostics and asset activity; and display this data on software platforms in map or table formats to help fleet operators manage their resources.

Worksites such as quarries, streets being paved, and buildings being constructed, have expensive construction vehicles moving about. For surface mining, very large work machines such as off-highway trucks, large wheel loaders, large track-type tractors, excavators, and the like, perform work functions such as digging, dozing, and hauling. The movement must be coordinated to avoid interference between machines, vehicles, and people. Movement is also monitored to determine cycle time and other productivity measures.

For example, in a quarry, hydraulic mining shovels known as loaders combine the benefits of high digging forces with large capacity buckets. A loader may weigh 300,000 lbs, be more than 10 meters in length, and have a bucket capacity of 30 cubic yards. The loaders work in cooperation with mining trucks, which are oversized dump trucks. Empty trucks sit waiting in a staging area until dispatched to the jobsite where the loader is working (sometimes referred to herein as the "dig site"). A loader loads a load of rock and carries it a short distance to a truck that has travelled from the staging area to the dig site, and dumps the rock in the truck. One or more of the trucks may be at the dig site waiting to be loaded. Wait time is expensive due to the labor, fuel and other operational expenses to keep the machine running. Each loader may have to wait, too, depending on inaccuracies in dispatch, the worksite configuration and the number of trucks allocated. The time it takes to empty the truck, travel to the jobsite of the loader, receive a new load from the loader, travel to the dump site, and dump the new load from the truck is the cycle time of the truck. The shorter the cycle time the more efficient and cost-effective the work is.

Historically, the cycle time of an asset was measured by a supervisor using a stopwatch. The supervisor manually tallied the trip time, usually without any details other than the amount of time it took the asset to go from and return to the location of the supervisor with a stopwatch. The traditional approach is not particularly accurate or precise. The cycle does not account for any segments of the asset's trip, but only accounts for the total time of the total trip. It requires a supervisors time and attention. In addition, it required the supervisors line of sight to at least some portions of the roundtrip and manual tallies by the supervisor prior to any action to improve efficiency.

Newer systems impose a geofence around the dump site and another geofence around the staging area, and track the time it takes a truck to leave the dump site or staging area geofence, arrive at the staging area geofence or dump site, then return to the dump site or staging area geofence. Crossing the perimeter of a geofenced area sends a data point comprising the fence coordinates and time of crossing. Unfortunately, currently available geofence systems are not particularly accurate or precise due to a number of error sources. For example, given that the staging area may be large enough for many trucks to wait in line, and the truck to be loaded may be at the far side of the staging site, the time the truck enters the geofenced staging site is not really when it is loaded; loading may occur long after the loader enters the staging site. The other problem is that the loading site moves. As the loader has to drive further or closer into the staging site as more rock is removed, actual locations for loading change during the day. With traditional geofencing, this geofence has to be manually moved. Without a mobile jobsite to accurately measure the time it takes for each leg, it is difficult to optimize productivity of the material movement or production rate. It would be desirable to more accurately determine when the loading starts and ends for each leg of the cycle.

Similarly, in paving, the paver needs material supplied at the right temperature. Too many trucks waiting at the paver could mean the material is cooling down and there is a lot of waste in terms of fuel, labor, and material. Too few trucks means the paver would have to stop, which is very costly. Current geofence systems do not move and have to be manually updated or only have the ability to be in a certain radius which includes trucks that are not related to the operation because the shape is not flexible.

Another problem with the current geofence system is that readings are inconsistent, even within the wide range of accuracy. That is, many of the GPS readings are outside the confidence interval and skew the averages of the length of time it takes to complete each leg. It would be desirable to determine which readings are noise and to filter out the noise.

Yet another problem with the systems of the prior art is that the static geofences of the prior art systems must be manually moved when the assets whose cycle times are being tracked no longer trigger the geofence because their actual destination is no longer within the geofence. In prior art systems, a user must delete the geofence in the system and redraw a new geofence each time the geolocation of its points must be changed. This is so impractical as to render such systems useless in many if not most applications.

BRIEF SUMMARY OF EMBODIMENTS OF THE PRESENT INVENTION

This system optimizes productivity calculations for jobs involving coordinated assets, whether mobile or stationary, such as that for mining, quarry, and paving, by measuring location, time, movement, and number of assets moving in and out of a mobile geofence(s). A GPS-receiving device is placed on or in each asset to be monitored. A geofence is created in relation to the GPS-receiving device and bound to it, so that when the GPS device moves, the geofence moves. The geofence perimeter is customizable as to shape and dimension in relation to the selected asset and as to whether the asset is inside the geofence or not. Preferably the GPS-receiving device is in a tablet or other mobile communication device that can communicate to a remote computer using wi-fi or cellular signals.

The GPS-receiver receives the time and location signals and calculates the location of the mobile communication device at periodic intervals. The mobile communication device transmits the location and time to the remote computer and stores the data in a database. Given the location and time signals, the location of the geofenced area and its direction and speed can be determined. The number of assets, location, and movement in and out of geofences are used for precise measurements for optimizing productivity.

To improve accuracy, the system stores only those readings that meet certain criteria, filtering outliers from the data.

Embodiments of the present invention are directed to a system for managing assets at a worksite. In one embodiment, the system comprises: a system computer device in communication with a database; a first communication device capable of being disposed on or in a first mobile asset, the first communication device comprising a receiver of geolocation signals, at least one computer processor and at least one memory resource storing instructions that, when executed by the at least one computer processor causes the first communication device to generate geolocation data related to its geolocation based on the geolocation signals, and to communicate the geolocation data over a network to the system computer device; a second communication device capable of being disposed on or in a second mobile asset, the second communication device comprising a receiver of geolocation signals, at least one computer processor and at least one memory resource storing instructions that, when executed by the at least one computer processor causes the second communication device to generate geolocation data related to its geolocation based on the geolocation signals, and to communicate the geolocation data over the network to the system computer device; and wherein the system computer device comprises at least one computer processor and at least one memory resource storing instructions that, when executed by the at least one computer processor receives the geolocation data from the first and second communication devices over a network and stores the geolocation data in the database and stores in the database at least one datapoint of geolocation data representing a geofence, wherein the geofence relates to the geolocation data of the first communication device.

In another embodiment of the system according to the present invention, the system computer device periodically updates the at least one datapoint of the geofence based on the geolocation data of the first communication device disposed on or in the first mobile asset. In another embodiment, the update by the system computer device comprises changing each datapoint of the geofence proportionally with a change in the geolocation data of the first communication device, in the same direction as the change in the geolocation data of the first communication device. In another embodiment, the system computer device determines a cycle time of the second communication device by determining the amount of time that passes after the geofence is triggered by the second communication device, wherein the geofence is triggered by at least one of the conditions selected from the group consisting of: (1) the geolocation of the second communication device is about the same as the geolocation of at least one of the datapoints of the geofence; (2) the geolocation of the second communication device is between at least two of the datapoints of the geofence; and (3) the geolocation of the second communication device is within a preset distance of a datapoint of the geofence. In another embodiment, the at least one datapoint of geolocation data representing the geofence is a set of datapoints that, when the datapoints are connected by a continuous line, forms a closed shape that starts and ends at the same datapoint. In another embodiment, the system computer device is preset to maintain the datapoints of the geofence such that the geolocation of the first communication device is outside the closed shape of the geofence. In another embodiment, the at least one datapoint of geolocation data representing the geofence is a set of datapoints that, when the datapoints are connected by a line, forms a shape comprising a series of straight line segments. In another embodiment, the at least one datapoint of geolocation data representing the geofence is a set of datapoints that, when the datapoints are connected by a line, forms a shape that is a polygon. In another embodiment, the system computer device periodically updates the at least one datapoint of the geofence based on orientation data of the first communication device disposed on or in the first mobile asset, wherein the orientation data comprises information generated by an accelerometer, magnetic sensor and/or power take-off sensor disposed on or in the first communication device. In another embodiment, the geolocation of the at least one datapoint of the geofence is at least a distance from the first mobile communication device that is greater than a dimension of the first mobile asset. In another embodiment, the geolocation of the at least one datapoint of the geofence is less than a distance from the first mobile communication device that is about a dimension of the second mobile asset.

Embodiments of the present invention are also directed to a method for managing assets at a worksite. In one embodiment, the method is performed by one or more computer processors, and the method comprises: generating geolocation data related to the geolocation of a first and second communication device, the first communication device capable of being disposed on or in a first mobile asset and the second communication device capable of being disposed on or in a second mobile asset; receiving, over a network, the geolocation data and storing it in a database; and storing in the database at least one datapoint of geolocation data representing a geofence, wherein the geofence relates to the geolocation data of the first communication device.

In another embodiment of the method according to the present invention, the method further comprises updating the at least one datapoint of the geofence based on the geolocation data of the first communication device disposed on or in the first mobile asset. In another embodiment, the step of updating the at least one datapoint of the geofence comprises changing each datapoint of the geofence proportionally with a change in the geolocation data of the first communication device, in the same direction as the change in the geolocation data of the first communication device. In another embodiment, the method further comprises determining a cycle time of the second communication device by determining the amount of time that passes after the geofence is triggered by the second communication device, wherein the geofence is triggered by at least one of the conditions selected from the group consisting of: (1) the geolocation of the second communication device is about the same as the geolocation of at least one of the datapoints of the geofence; (2) the geolocation of the second communication device is between at least two of the datapoints of the geofence; and (3) the geolocation of the second communication device is within a preset distance of a datapoint of the geofence. In another embodiment, the at least one datapoint of geolocation data representing the geofence is a set of datapoints that, when the datapoints are connected by a continuous line, forms a shape that is a polygon. In another embodiment, the method further comprises periodically updating the at least one datapoint of the geofence based on orientation data of the first communication device disposed on or in the first mobile asset, wherein the orientation data comprises information determined based on information generated by an accelerometer, magnetic sensor and/or power take-off sensor disposed on or in the first communication device. In another embodiment, the geolocation of the at least one datapoint of the geofence is less than a distance from the first mobile communication device that is about a dimension of the second mobile asset.

Embodiments of the present invention are also directed to a non-transitory computer-readable medium that stores instructions, executable by one or more processors, to cause the one or more processors to perform operations that comprise: generating geolocation data related to the geolocation of a first and second communication device, the first communication device capable of being disposed on or in a first mobile asset and the second communication device capable of being disposed on or in a second mobile asset; receiving, over a network, the geolocation data and storing it in a database; storing in the database at least one datapoint of geolocation data representing a geofence, wherein the geofence relates to the geolocation data of the first communication device, and wherein the at least one datapoint of geolocation data representing the geofence is a set of datapoints that, when the datapoints are connected by a continuous line, forms a shape that is a polygon; and updating the at least one datapoint of the geofence based on the geolocation data of the first communication device disposed on or in the first mobile asset by changing each datapoint of the geofence proportionally with a change in the geolocation data of the first communication device, in the same direction as the change in the geolocation data of the first communication device.

In another embodiment of the non-transitory computer-readable medium, the medium further comprises instructions to cause the one or more processors to perform operations that comprise: determining a cycle time of the second communication device by determining the amount of time that passes after the geofence is triggered by the second communication device, wherein the geofence is triggered by at least one of the conditions selected from the group consisting of: (1) the geolocation of the second communication device is about the same as the geolocation of at least one of the datapoints of the geofence; (2) the geolocation of the second communication device is between at least two of the datapoints of the geofence; and (3) the geolocation of the second communication device is within a preset distance of a datapoint of the geofence.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more embodiments of the invention and are not to be construed as limiting the invention. Note that some of the drawings list certain types of data employed by embodiments of the present invention. The particular words describing such data may be different across various embodiments.

FIG. 6B is an example of data available on a dashboard according to an embodiment of the present invention;

DETAILED DESCRIPTION OF THE INVENTION

Figure 1:
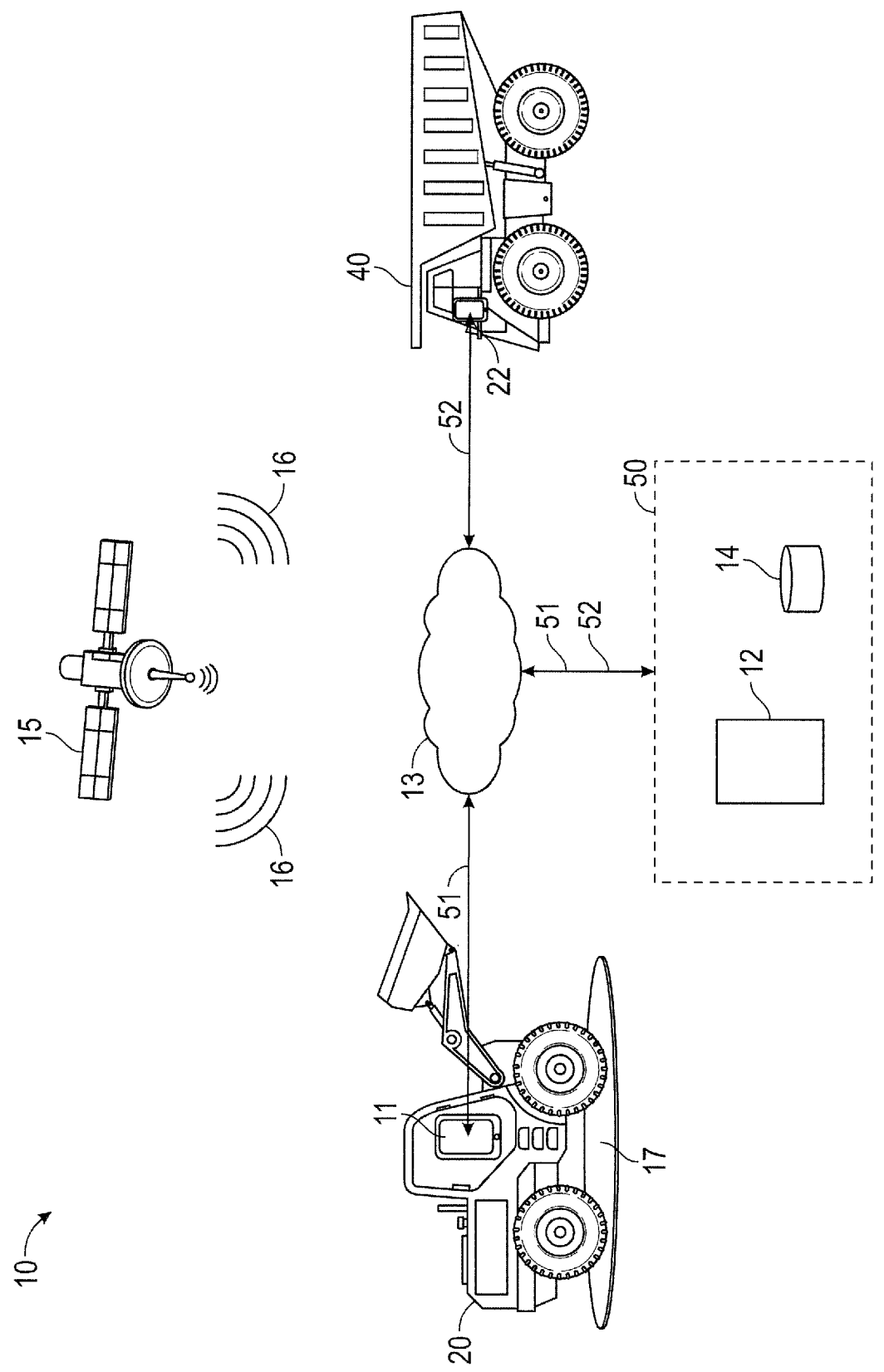
FIG. 1 is a schematic illustration of a system according to an embodiment of the present invention.

The term "asset" as used herein refers to any object to be monitored according to the present invention, which includes but is not limited to any vehicle, including loader 20 and truck 40 described herein, any object, and any person. The term "mobile" as used herein refers to anything that can move in relation to a point in space. The term "device" or "computer device" as used herein refers to any computing device(s), including desktop computers, cellular phones or smartphones, laptop computers, computer "tablets", televisions, servers, etc., that can provide network connectivity and processing resources to enable communication between other devices of a system over a network. The term "GPS" as used herein refers to the Global Positioning System. However, embodiments of the present invention are not limited to GPS as the only means of determining the geolocation of an asset. For purposes of the examples described herein, GPS is described as the means of determining the geolocation of an asset, but the claims are not necessarily limited to GPS, and may recite any system that makes it possible to determine the location of an asset on the earth, including an inertial navigation system or a navigation system using signals of opportunity. For that reason, the term "geolocation" as used herein refers to the location of an object relative to a point in space. The term "geolocation signal" as used herein refers to any signal created by a system that is capable of communicating the geolocation of a device or asset, or at least a signal necessary for a device to determine the geolocation of the device or asset. The term "geolocation data" as used herein refers to any data comprising information related to the geolocation of a given object, for example, of an asset or device. The term "worksite" as used herein refers to an area where multiple jobsites are coordinated for a given project. The area where a particular asset is located is sometimes referred to herein as the "jobsite", and the "jobsite" may be associated with the mobile geofence 17 of certain embodiments of the present invention. Accordingly, sometimes the term "jobsite" is used herein interchangeably to refer to a geofence, including to mobile geofence 17. The term "orientation" as used herein refers to the position of a primary axis of an asset relative to an x-y coordinate system in a given geolocation.

Embodiments of the present invention are directed to fleet management system 10. System 10 is described herein in the context of construction vehicles at quarrying, mining, paving or construction worksites, but may be used with any vehicle or job. For purposes of the example described herein, the worksite is a quarry in which loader 20 (e.g., a hydraulic mining shovel) and truck 40 (e.g., an off-highway mining dump truck) are used (each loader 20 and truck 40 also being referred to as "assets"). Loader 20 digs rock at a jobsite, which in this example is dig site 3, empties it into waiting truck 40, and once loaded, truck 40 drives away to empty the rock at a second jobsite, dump area 4.

System 10 preferably comprises a first communication device 11 to be disposed in or on a first mobile asset that is a destination point for a second mobile asset whose cycle time is being measured. Preferably, first communication device 11 is capable of receiving geolocation signals, for example GPS, on or in an asset, and is preferably mobile, for example a tablet. However, in some embodiments, the time and location data are provided by a geolocation-providing source other than GPS, such as an inertial navigation system or a navigation system using signals of opportunity. Referring to FIG. 1, system 10 according to one embodiment of the present invention, comprises first communication device 11 that is a GPS-enabled mobile computer tablet, disposed on or in loader 20. There may be any number of first communication devices 11, depending on the number of assets desired to be tracked and/or the number of geofences 17 that are intended to be formed.

System 10 preferably comprises a second communication device 22 to be disposed in or on a second mobile asset whose cycle time is being measured. In one embodiment, this second asset is a vehicle (e.g., truck 40) that is being tracked in terms of its cycle time from a first jobsite (e.g., dig zone 3) to a second jobsite (e.g., dump area 4). Second communication device 22 is preferably disposed in or on truck 40. Second communication device 22 is preferably a standard cell-based receiver or telematics device, is preferably capable of receiving geolocation signals, for example GPS, and is preferably mobile, for example a computer tablet. There may be any number of second communication devices 22, depending on the number of second assets desired to be tracked.

Preferably each communication device 11 and 22 is capable of wireless communication using wi-fi, cellular, or satellite signals to use fleet management software application 50 to communicate and exchange data with remote system computer 12 and remote database 14 over network 13. Using mobile communication devices allows them to be removed from one asset and later used in a different asset, without having to buy additional devices. In some embodiments, however, the mobile communication device is not removable like a tablet, but instead is physically attached to the asset. In one embodiment, it is physically attached to the asset such that only the administrator of system 10 (or owner of the asset) can remove it, so that the owner or administrator can reliably manage the location of the asset and prevent unauthorized use or theft. The particular location of communication devices 11 or 22 on or in the asset is irrelevant, as long as the movement of the device is correlated with the movement of the asset.

Referring to FIG. 1 illustrating one embodiment of the present invention involving loader 20 and truck 40, first communication device 11 periodically receives geolocation signal 16, a GPS signal from the GPS satellite 15. In a typical GPS system, geolocation signal 16 would be received at least every second under good conditions. First communication device 11 preferably uses geolocation signal 16 to determine its geolocation data 51, which preferably includes the time, latitude and longitude of its then-current geolocation. First communication device 11 transmits its geolocation data to remote system computer 12 via cloud internet 13 and geolocation data 51 is stored in remote database 14, which is in communication with computer 12. With geolocation data 51 being transmitted to remote system computer 12 periodically (typically about every one second for GPS systems), eventually a large dataset of geolocation data 51 points is developed. From the dataset, a detailed description of each leg of the travels of loader 20 can be developed.

One of the objectives of the present invention is to provide an accurate way of tracking a first asset in relation to a second asset. Embodiments of system 10 of the present invention preferably create mobile geofence 17 to be related to a mobile asset, for example loader 20, itself. Mobile geofence 17 preferably comprises a set of datapoints comprising geolocation data representing a boundary around first communication device 11, which mobile device is preferably bound to a mobile asset, for example loader 20. Mobile geofence 17 is preferably bound to the mobile asset in that first communication device 11 is bound to the asset, and mobile geofence 17 moves with the mobile asset in that there is a direct relationship between the geolocation of the mobile asset and the geolocation of each geolocation datapoint comprising mobile geofence 17. Referring to FIG. 1, mobile geofence 17 is preferably a set of datapoints stored in database 14, each geolocation datapoint of mobile geofence 17 being related to geolocation data 51 obtained over network 13 from first communication device 11, the datapoints of mobile geofence 17 being stored on database 14 and regularly or periodically updated according to any change in the geolocation of first communication device 11 as represented by geolocation data 51. Preferably, mobile geofence 17 is such that every geolocation data point of the geofence is directly related with geolocation data 51 representing the geolocation of the asset. In one embodiment, they are related in that any change in any given direction of the geolocation of loader 20 causes the same or a proportional change in the given direction of the geolocation data points of mobile geofence 17. In another embodiment, they are related in that every geolocation data point of mobile geofence 17 has a mathematical relationship to geolocation data 51 according to the desired shape of mobile geofence 17.

Mobile geofence 17 can be of any shape of any dimensions, including, for example, polygonal, rectangular, quadrilateral, circular, triangular, square, etc. As described further herein, the shape is preferably preset using mobile communication device 11 and/or 22 or system computer 12 based on the particular conditions of the worksite and the dimensions of the assets. In one embodiment, the shape of mobile geofence 17 comprises a series of straight line segments, which straight line segments can be of any angle relative to the other line segments. In this way, a user of system 10 can simply provide instructions to system computer 12 by selecting a series of points of a geolocation on a map display and the system computer generates a line segment between the points so that the user can view the geographic region being enclosed by the geofence. Preferably, the shape of mobile geofence 17 is closed, that is, it forms a continuous boundary in which all of the datapoints, when connected together by a line, form line segments and/or curves that start and end at the same point. For example, in one embodiment of the present invention, mobile geofence 17 is circular, as illustrated in FIGS. 1 and 7A. In another embodiment, mobile geofence 17 is rectangular, as for example shown in FIGS. 3 and 7B. In those illustrated embodiments, a preset number of datapoints of geolocation data representing mobile geofence 17 make up a series of datapoints that, if a line were to be drawn connecting them, would form the shape of the mobile geofence 17 The number of datapoints forming mobile geofence 17 can vary, and depends on the particular method employed by the system computer 12 to determine when mobile geofence 17 is triggered. In one embodiment, a single datapoint of geolocation data represents mobile geofence 17, and system computer 12 considers such mobile geofence 17 triggered when the geolocation data 52 of truck 40 comes within a preset radius of distance of the datapoint. In a sense, the shape of the mobile geofence 17 that is only a single datapoint can also be described as circular because system computer 12 is also computing distances within a radius of the single datapoint. In another embodiment, a set of datapoints of geolocation data represents mobile geofence 17, each datapoint of the geofence itself having a geolocation that, when a line is formed between it and the next closest datapoint of the set of datapoints of the geofence, forms the shape. A circular mobile geofence can also be formed in that manner, as well as polygonal shapes or any other shape. For the reasons further described herein, polygonal shapes of mobile geofence 17 are very useful in generating a mobile geofence 17 that is triggered only when desired. Accordingly, in some embodiments, polygonal shapes of mobile geofence 17 are preferred, including but not limited to rectangular shapes.

The term "rectangular" as used herein is to be interpreted in the broadest sense of the word and not limited to the shape formed by a single rectangle but can include any shape formed by a series of straight lines connected at 90 degree or 270 degree angles. In some embodiments of the present invention, the rectangular shape is a single rectangle, that is, it comprises four sides with four right angles. In some embodiments, it is a series of straight lines connected at either 90 degree angles or 270 degree angles such that it appears as a combination of rectangles forming a single shape formed by a single line with more than four sides, as for example depicted in FIG. 7B.

Mobile geofence 17 can be oriented in various ways in relation to first communication device 11. In one embodiment of the present invention, mobile geofence 17 is circular and centered on first communication device 11, as illustrated in FIGS. 1 and 7A. In another embodiment, mobile geofence 17 is not centered on a device and does not encircle or surround it but is adjacent to first communication device 11 such that the geolocation of first communication device 11 is not located within or between the geolocation data points of geofence 17, as for example shown in FIGS. 3 and 7B. In other words, the geolocation of first communication device 11 is outside the shape of mobile geofence 17. This is preferred in some embodiments because using a circular mobile geofence 17 would capture more activity than desired (that is, be triggered by assets not intended to trigger the geofence). For example, if a paver is paving one side of a road and circular geofence 17 is centered on the paver, a first truck 40 (perhaps an asphalt truck) coming up on the left side of the paver may desirably trigger the geofence while a second truck 40 (perhaps a construction vehicle) on the right side of the paver—on the other side of the road—may create unrelated and undesirable geofence "triggers" when the second truck 40 crosses geofence 17. This problem can be prevented by creating geofence 17 such that it exists only on a particular side of the asset where the activity is to be detected, as for example illustrated in FIG. 7B in which mobile geofence 17, being directly related to mobile communication device 11 disposed in loader 20, comprises a polygonal or rectangular shape that is adjacent only to the front of the loader and its right side.

Figure 3:
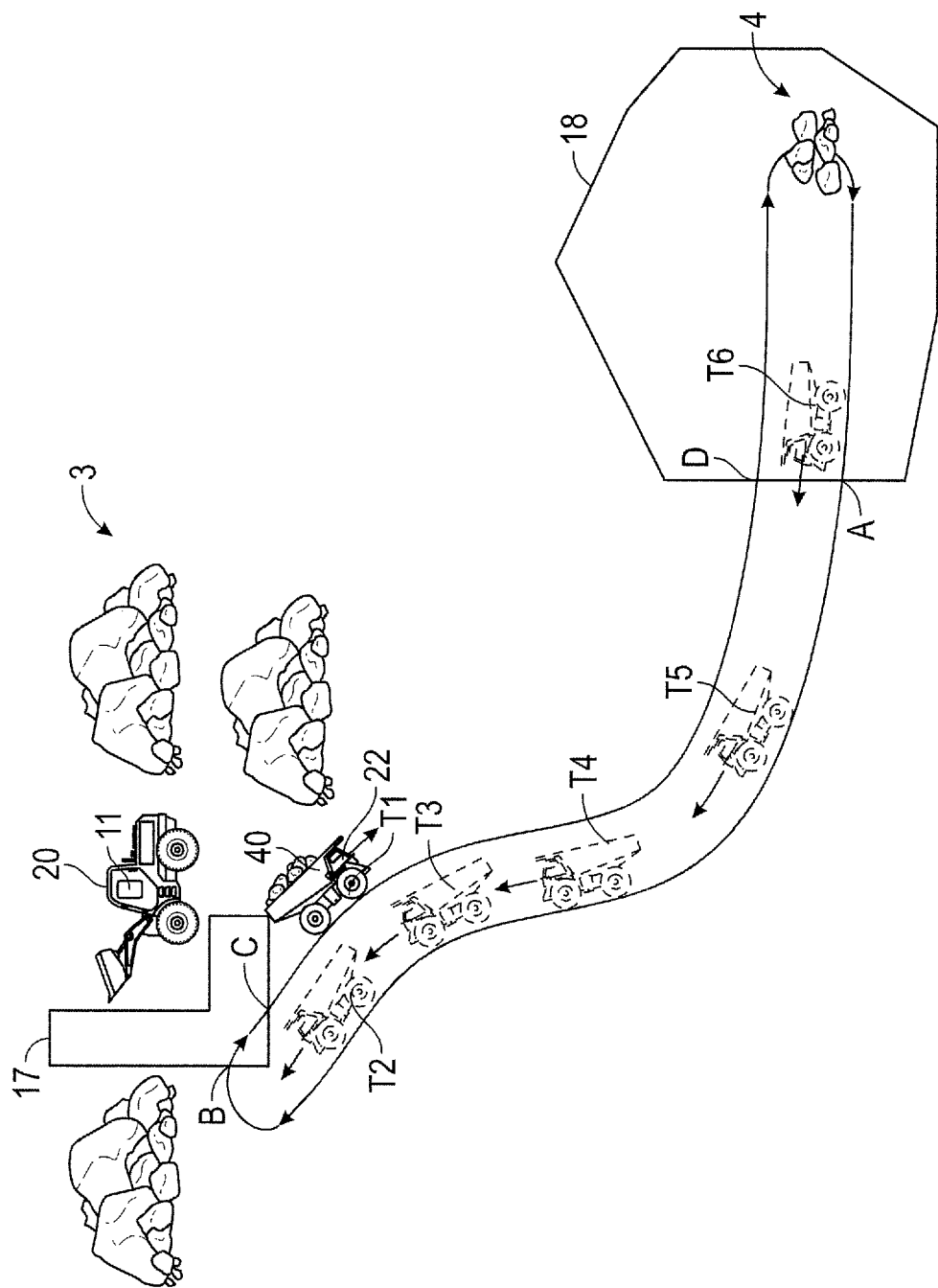
FIG. 3 is a schematic illustration of a worksite using mobile geofences according to an embodiment of the present invention.
Figure 7B:
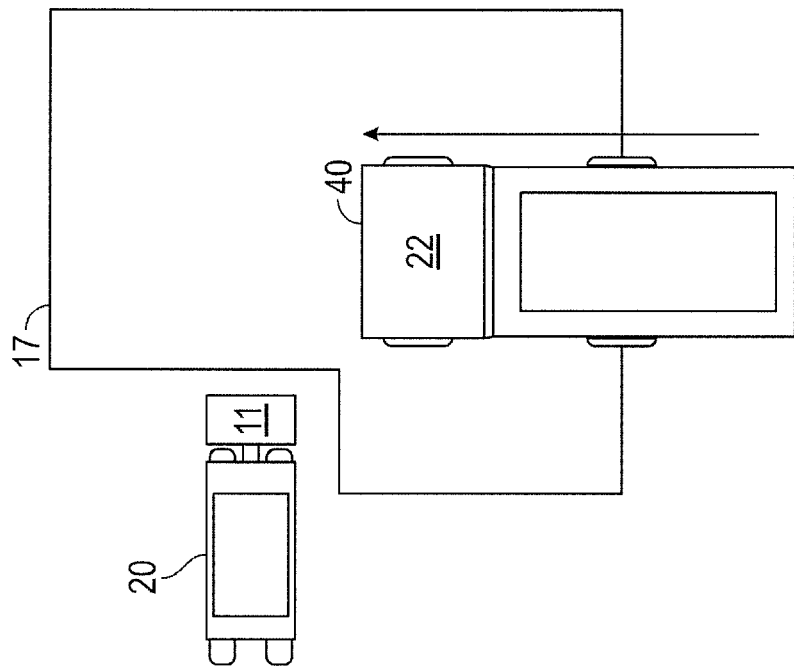
FIG. 7B is a top view of a truck approaching a loader having a rectangular mobile geofence not centered on the loader according to an embodiment of the present invention.
Figure 7A:
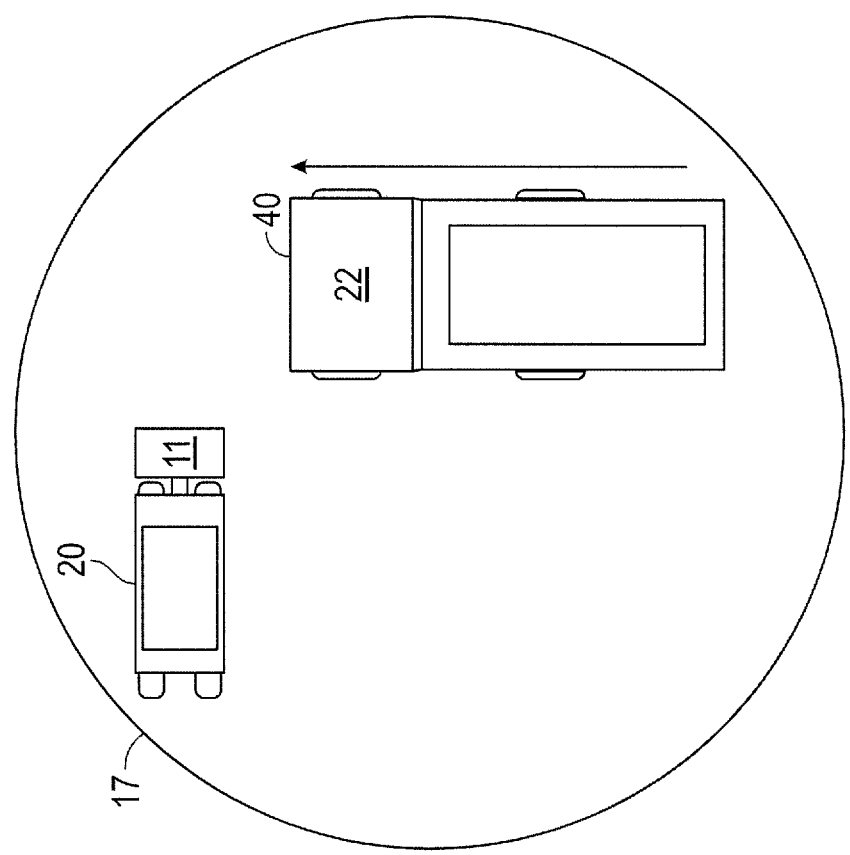
FIG. 7A is a top view of a truck approaching a loader having a circular mobile geofence centered on the loader according to an embodiment of the present invention.

For example, in one embodiment illustrated in FIGS. 3 and 7B, mobile geofence 17 comprises a polygonal or rectangular shape, is not centered on loader 20 or first communication device 11 and is instead adjacent to it. The polygonal shape comprises a series of connected straight lines at 90 degree angles to each other. In such embodiment, mobile geofence 17 is still mobile in the sense that every geolocation datapoint 51 of mobile geofence 17 is directly related to the geolocation of first communication device 11 bound to loader 20 and may change as the geolocation of loader 20 may change. Mobile geofence 17 is preferably such that every geolocation data point of the geofence is directly associated with the geolocation of loader 20, that is, any change in any given direction of the geolocation of loader 20 causes the same change in the given direction of the geolocation data points of mobile geofence 17. In such embodiment, mobile geofence 17 also preferably rotates as loader 20 rotates so that its shape maintains the same relationship to the side of loader 20 it was preset to be bound to. In other words, the shape of mobile geofence 17 stays the same, that is, the relationship of each geolocation datapoint of mobile geofence 17 stays the same relative to each other geolocation datapoint of mobile geofence 17, but the geolocation of each geolocation datapoint 51 may change based on the change of the geolocation of first communication device 11.

In some embodiments, system computer 12 receives additional data from additional devices in order to determine and track the orientation of communication devices 11 and 22. Such orientation data, in some embodiments, may be necessary to maintain the orientation of mobile geofence 17 in a certain desired orientation, for example adjacent to a certain side of the asset as described above. For example, in one embodiment, system computer 12 determines if loader 20 has moved in the opposite direction (for example, by determining that the asset's direction of geolocation has changed about 180 degrees relative to its prior direction of geolocation), in which case system computer 12 flips or rotates mobile geofence 17 the same angle of change so that mobile geofence 17 always stays on the same side of the asset as intended. In one embodiment, orientation data is obtained by including in geolocation data 51 data relating to the direction mobile communication device 11 is pointing. In some embodiments, communication devices 11 and/or 22 employ additional devices that provide information regarding orientation, including but not limited to sensors indicating whether the asset is moving forward or in reverse, magnetic field sensors, accelerometers and/or power take-off ("PTO") sensors. The orientation of mobile geofence 17 can thereby be maintained in relation to the direction of mobile communication device 11, such that if mobile communication device 11 turns, rotates or pivots, the entire shape of mobile geofence 17 also turns, rotates or pivots proportionally in relation thereto. Maintaining the orientation of mobile geofence 17 is not required or even preferred in some embodiments. Rather, in some embodiments, the orientation of mobile geofence 17 is not maintained relative to the orientation of the asset such that, while mobile geofence 17 moves relative to the geolocation of communication device 11 in loader 20, a rotation or other change in orientation of the loader 20 itself will not by itself alter the orientation of mobile geofence 17. In some embodiments, orientation data can be determined from the direction of movement inherent in the change in geolocation of the asset itself, as indicated by changes in geolocation represented by geolocation data 51.

Figure 2:
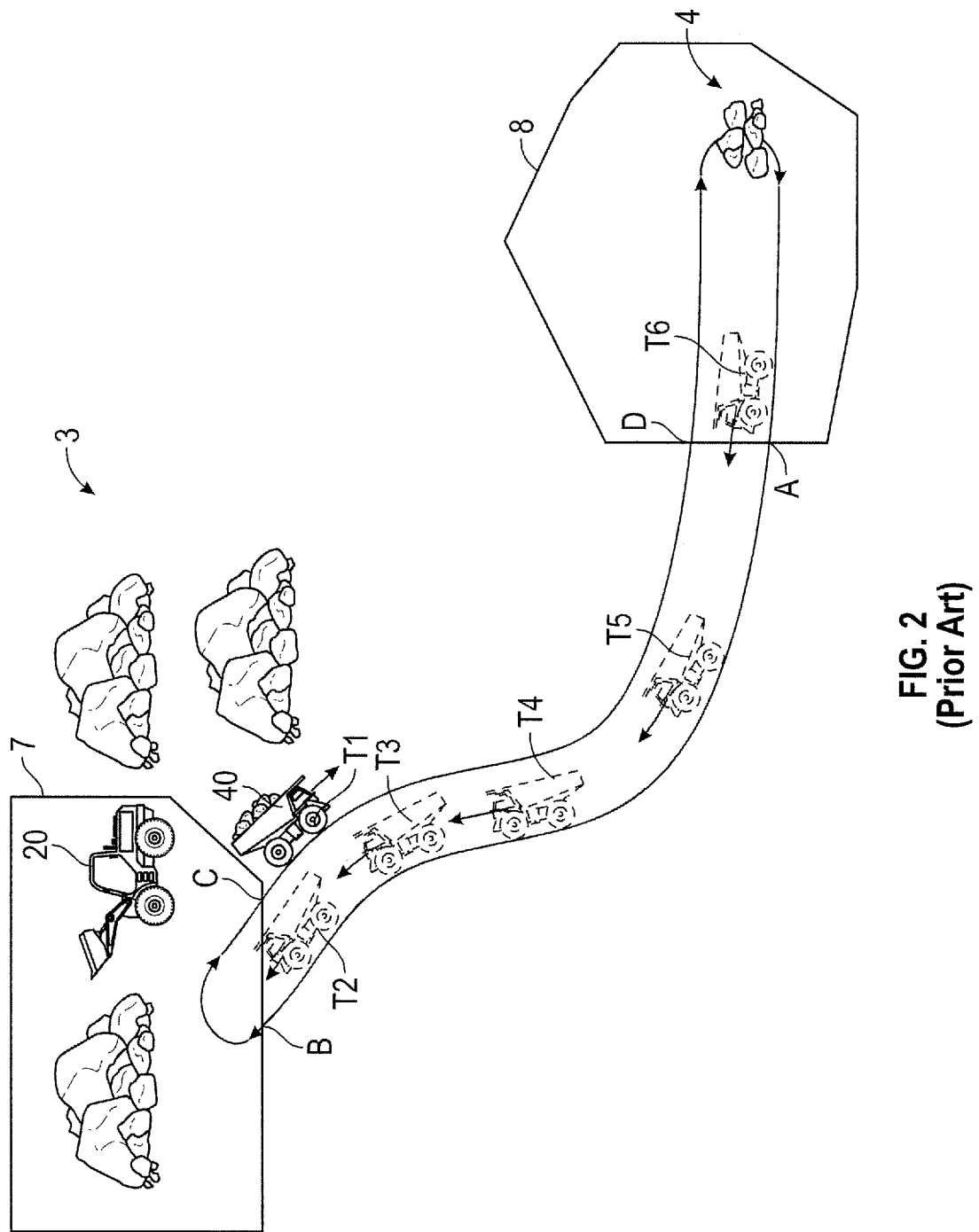
FIG. 2 is a schematic illustration of a worksite of the prior art using static geofences.

One of the objectives of system 10 of the present invention is to avoid the inaccuracy, imprecision, and impracticality of moving a jobsite manually and using static geofences. FIG. 2 illustrates a quarry worksite of the prior art using static geofences. The quarry worksite has a dig zone 3 some distance from a dump area 4 where trucks 40 empty the rock collected from dig zone 3. Prior art systems create a static geofence 7, that is, it only creates geofences related to a non-mobile location, for example dig zone 3, and a second static geofence 8 is created around a second non-mobile location, for example dump area 4. In FIG. 2, truck T1 is shown travelling from dump area 4 to dig zone 3 to be filled with rock. Once filled with the rock by a loader at dig zone 3, truck 40 then leaves dig zone 3 and travels back to dump zone 4 to dump out the rock. The roundtrip movement of each truck 40 is indicated by the line. Trucks T2 to T6 are shown waiting in line to be loaded. To measure the leg of the cycle time of a truck 40 moving from where it dumps the rock at dump area 4 to where it is loaded at dig zone 3, the start time is triggered when the truck exits dump zone 4 at point A where the path of the particular truck 40 intersects second static geofence 8. Regardless of how far the particular truck 40 has to travel from where it dumps the rock, the start time is triggered when the truck 40 exits second static geofence 8 at point A. This creates an inaccurate start time because truck 40 may have to travel a great deal of time within second static geofence 8 to trigger the start time (e.g., the time it takes for truck 40 to travel from dump area 4 to point A). Similarly, the end time of the leg to reach loader 20 is triggered when truck 40 crosses static geofence 7 at point B near dig zone 3. Regardless of how far truck 40 has to travel to reach loader 20 within static geofence 7, the end time is triggered when truck 40 crosses static geofence 7 at point B. This creates an inaccurate end time because truck 40 may have to travel or wait a great deal of time within static geofence 7 to trigger the end time. Furthermore, these measurements do not permit the accurate measurement of wait time within static geofence 7. For example, a second truck 40 may have to wait for loader 20 while the loader is filling a first truck 40 while both first and second trucks 40 are within static geofence 7, which is not a true measure of travel time but instead incorporates a measure of wait time. The same problem occurs if the end time is measured at Point C instead of Point B, or at point D instead of Point A.

Another problem leading to the inaccuracy of the prior art system illustrated in FIG. 2 has to do with the fact that static geofences 7 and 8 of prior art systems are static, that is, none of the geofences are related to the geolocation of a mobile asset such as loader 20, but instead are related only to a non-mobile jobsite such as dig zone 3 or dump zone 4. Non-mobile jobsites such as dig zone 3 or dump zone 4 are typically large geographic areas, and the actual terminal or initial destination point of an asset whose cycle time is being measured, such as truck 40, is a significant distance within the jobsite. Furthermore, that destination point typically grows more distant over time as, in the case of a quarry, more rock is dug out of dig zone 3 and the digging area gets pushed deeper into dig zone 3. Embodiments of the present invention relate mobile geofence 17 to a mobile asset, such as loader 20, that is the actual destination point of the asset whose cycle time is being measured.

Yet another problem with the systems of the prior art is that the static geofences of the prior art systems must be manually moved when the assets whose cycle times are being tracked no longer trigger the geofence because their actual destination is no longer within the geofence. For example, it is common that a loader 20 moves a significant distance ten times a day, which distance is likely outside the area encompassed by static geofence 7, and trucks 40 would miss the static geofence 7 and it won't be triggered. To correct this in prior art systems, static geofence 7 must be moved by a user deleting the geofence in the system and redrawing a new geofence each time the geolocation of its points must be changed. This is so impractical as to render such systems useless in many if not most applications. Embodiments of the present invention relate mobile geofence 17 to a mobile asset, such as loader 20, that is the actual destination point of the asset whose cycle time is being measured such that mobile geofence 17 does not need to be reset unless communication device 11 is moved to a different asset entirely.

Embodiments of the present invention track a first asset in relation to a second asset by determining when the geolocation of, for example, the second asset "triggers" mobile geofence 17 associated with the first asset. Mobile geofence 17 is said to be "triggered" by an asset when the geolocation of the asset, for example truck 40, as represented by geolocation data 51 or 52, is about the same as one of the datapoints of mobile geofence 17 or is between at least two datapoints of mobile geofence 17 or within a certain (preferably preset) distance of a datapoint of mobile geofence 17. The time and/or geolocation of the "trigger" is data that is then used to determine cycle times of the asset that triggered mobile geofence 17, as described in more detail herein. Each mobile asset whose cycle time is being measured, for example truck 40, is preferably equipped with second communication device 22 that receives GPS coordinates or is otherwise capable of determining its geolocation. To measure the leg of the cycle time of truck 40 moving from where it dumps the rock at dump zone 4 to where it is loaded at dig site 3, the start time is triggered when truck 40 exits dump zone 4 when it crosses second geofence 18 at point A. The end time of the leg to reach loader 20 is triggered when truck 40 crosses mobile geofence 17 associated with loader 20 at point B. Because mobile geofence 17 moves with loader 20, the actual distance traveled by truck 40 is measured more accurately than if the geofence was static. This determines a more accurate time for this leg of the cycle time because it eliminates the travel time within the static geofence of the prior art. In another embodiment, a second leg of truck 40 is measured, with the time for the second leg starting when truck 40 crosses mobile geofence 17 at Point C and ending when it crosses second geofence 18 at Point D. This method also permits accurate measurement of wait times, because if loader 20 is sitting still until a truck 40 crosses mobile geofence 17, it can be presumed that the still time is waiting for truck 40 to be available. Measuring the second leg of truck 40 travel time between Points C and D also provides data from which the wait time of truck 40 can be determined, by calculating the difference in time between Points B and C and/or between Points A and D.

Preferably the size and shape of each mobile geofence 17 and its triggers are manipulated or preset for more accurate measurements. FIG. 3 illustrates a quarry worksite of an embodiment of the present invention using a mobile geofence 17. In this illustrated example, system computer 12 creates mobile geofence 17 that is rectangular with all geolocation datapoints of mobile geofence 17 being at least a certain distance away (sometimes referred to herein as the "Minimum Distance") from device 11 such that the geofence is adjacent to loader 20 but not encircling or including it within the geofence. The Minimum Distance is preferably preset within computer 12. In one embodiment, the Minimum Distance is related to the dimensions of loader 20 itself and is set to exceed a certain dimension of loader 20, for example, the width and/or length of loader 20. In one embodiment, the Minimum Distance is about the distance between where device 11 sits in loader 20 and about where the loader drops its load (e.g., the furthest point loader 20 extends forward). For example, referring to FIG. 7B, the datapoints of mobile geofence 17 that are closest to first mobile communication device 11 disposed in loader 20 are farther away from the nearest dimensions (e.g., length, width, diagonal) of loader 20.

In another embodiment, all the datapoints of mobile geofence 17 are within or less than a predetermined distance from first mobile communication device 11 (sometimes referred to herein as the "Maximum Distance"). Preferably, the Maximum Distance is about the same distance as a dimension (e.g., length, width, diagonal) of a second asset. Referring to FIG. 7B, the Maximum Distance is about the distance of the largest dimension of truck 40, such that the size and shape of mobile geofence 17 is suited to only be triggered by a truck 40 coming to loader 20 to be loaded with material. In this way, the size of mobile geofence 17 is not likely to be such that other assets that do not consider that particular loader 20 to be its destination do not trigger mobile geofence 17 of that loader 20.

In another embodiment in which two loaders 20 are operating in close proximity and loading the same truck 40, then, instead of two jobsites, system 10 counts only the triggering of the mobile geofence 17 that is closer to truck 40, which results in more accurate cycle times for loading that truck 40.

Sometimes it may be desirable to make the geofence static, such as when loaders 20 are unloading rock into a ditch instead of truck 40. The ditch's location is static so its geofence around that jobsite can be, too. In the embodiment illustrated in FIG. 3, second geofence 18 is illustrated to be static, that is, it is not related with the geolocation of a mobile asset but to a static geolocation. Embodiments of the present invention do not require that all geofences are mobile. In some embodiments, it may be preferable to employ second geofence 18 that is static. In another embodiment, second geofence 18 is also mobile in that it is related to a first communication device 11 disposed on or in a mobile asset at or near the desired destination within that particular jobsite, for example a person, or mobile pole or box holding first communication device 11.

In another embodiment of the present invention, geofences 17 can be created for both the first and second asset, for example both loader 20 and truck 40. However, this increases the computations that are required to determine standard cycle times of the assets. For that reason, it is preferred that mobile geofences 17 only be created to relate with a single first asset (e.g. loader 20) or a small number of first assets (e.g. several loaders 20 and a mobile pole near dump site 4), and that only a portion of the total number of second assets (e.g., dump truck 40) are tracked for their cycle times.

System 10 employs devices to accomplish what is described herein. Embodiments of the present invention are preferably implemented through the use of instructions that are executable by one or more computer processors. In one embodiment, these instructions are carried on a computer-readable medium. Examples of computer-readable mediums include: permanent memory storage devices, including hard drives on personal computers or servers; portable storage units, including CD or DVD units; flash memory, including as carried on smartphones, multifunctional devices or tablets; magnetic memory; computers; terminals; network enabled devices including mobile devices and mobile phone devices; and any other machines or devices that use processors, memory, and instructions stored on computer-readable mediums. Embodiments of the present invention are also implemented in the form of computer-programs, software programs, software applications, whether downloadable directly to the users device or accessible from a user's device as a software-as-a-service in which most of the instructions for the invention are embedded on a centralized device, or a computer usable carrier medium capable of carrying such a program.

Embodiments of the present invention provide a technology-based solution that overcomes existing problems with the current state of the art in a technical way to satisfy an existing problem for determining accurate cycle times of assets whose operations are being tracked between jobsites at a worksite. Embodiments of the present invention are necessarily rooted in computer technology in order to overcome a problem specifically arising in the realm of computers, namely, faster query and data access times for determining the cycle times of assets being tracked. In traditional fleet management systems like those described in the background of this application, the geolocation data related to the assets whose cycle times are being determined by the computer did not accurately reflect the true cycle times of assets due to the inaccuracy of the geolocation data of the geofences, and thereby cause significant inefficiencies that can risk the operation at the worksite being unprofitable and even dangerous. Embodiments of the present invention achieve important benefits over the current state of the art, such as appropriately defining the geolocation data of a geofence by making it mobile and related to the movement of a mobile asset, and eliminating the needs for additional devices or systems or computer networks to track time that could not previously be tracked by existing fleet management systems (e.g., the time a number of trucks 40 might be waiting within static geofence 7 separate from the total time of the truck's travel time between jobsites).

System 10 is preferably embodied in machine readable code on a computer device to direct the management of data that is accessible on a server or by networked devices. Referring to FIG. 1 illustrating one embodiment, fleet management application 50 comprises remote system computer 12, a remote database 14, and a tracker app installed on mobile communication device 11 and/or device 22. The term "user" as used herein means any person accessing, using or taking action within system 10 described herein, including the person providing instructions to system computer 12 and/or a person providing instructions to a communication device disposed in or on an asset (e.g., devices 11 and 22). A user using or accessing system computer 12 records the possible assets at a given worksite into database 14 and the type of job each asset carries out, such as dumping, loading, paving or hauling. Preferably, each asset (e.g. each loader 20 and truck 40) reports its geolocation data 51 and 52 in real time (i.e., as regularly as possible given the conditions of geolocation signals 16 and network 13 can handle) to computer 12 and it is recorded in database 14.

Preferably, the user sets various preset or predetermined criteria, settings, and/or configurations using a communication device 11 or 22 accessing system computer 12 over network 13, including the Minimum Distance, the Maximum Distance, the shape, size and orientation of the geofence, etc. Using or accessing system computer 12, the user preferably defines mobile geofence 17 around each vehicle the user intends to treat as a jobsite, which may differ in size and shape depending on the vehicle and type of job, as described in various ways herein. In one embodiment, system computer 12 allows the user to set the datapoints of the geofence such that the geolocation of first communication device 11 is maintained to be outside the closed shape of the geofence.

Mobile geofence 17 is preferably represented by a set of datapoints of geolocation data stored by system computer 12 in database 14. For example, in one embodiment, a square-shaped mobile geofence 17 is represented by four datapoints of geolocation data stored in database 14, each datapoint in a corner of the square, the datapoints being (0, 0), $(x_{max}, y_{min})$, $(x_{min}, y_{max})$, $(x_{max}, y_{max})$ as would be represented on a typical two dimensional coordinate system. Those datapoints are related to geolocation data 51 of the geolocation of mobile communication device 11 disposed in a first mobile asset, for example loader 20, by updating each of the datapoints according to any change in geolocation data 51.

Assuming mobile geofence 17 was centered on mobile communication device 11, each datapoint of the geofence is periodically updated to maintain the same distance with geolocation data 51 that is updated to be at $((x_{max}-x_{min})/2, (y_{max}-y_{min})/2)$. The updated geolocation of each datapoint is stored in database 14. To determine if the geofence is triggered by second communication device 22 disposed in a second mobile asset, system computer 12 periodically receives geolocation data 52 related to the geolocation of truck 40, and queries database 14 when it updates geolocation data 52, to determine if geolocation data 52 is between zero and $x_{max}$ and zero and $y_{max}$ of the geolocation data of the datapoints of mobile geofence 17, in which case system computer 12 would consider the geofence triggered and store information in database 14 relating to the time such trigger event occurred. System computer 12, with such time data, can then make various determinations regarding the cycle time of second mobile asset relative to its destination at the first mobile asset.

Preferably, system computer 12 is not actually present at the worksite, but is remote, for example a device made accessible to a user through network 13. In some embodiments, system computer 12 is not a device independent of mobile devices 11 and 22, but is the same device as either devices 11 or 22.

Figure 4:
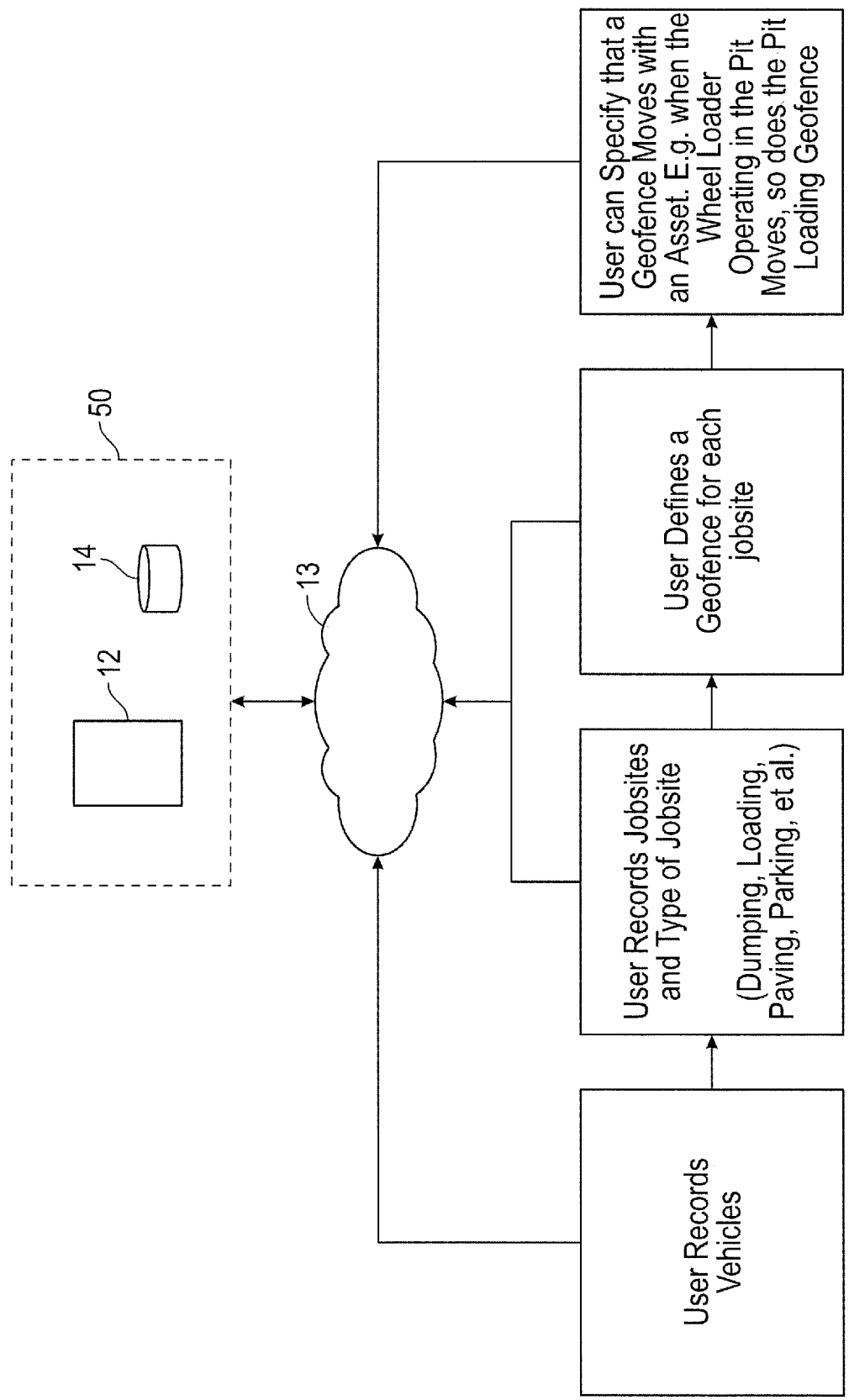
FIG. 4 is a flow chart of the asset and jobsite management portion of a system according to an embodiment of the present invention.
Figure 5:
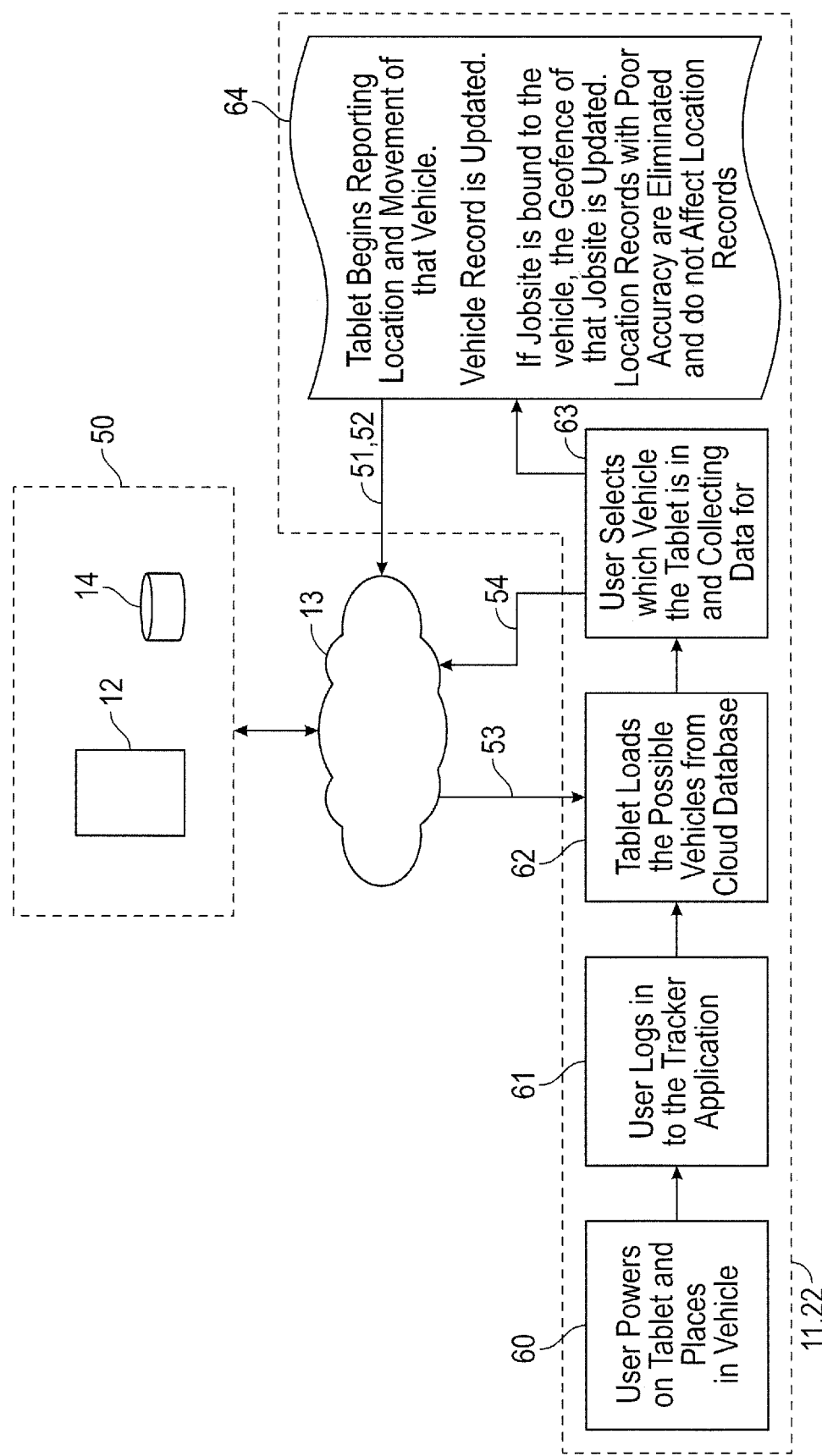
FIG. 5 is a flow chart of a process of receiving GPS data and recording it to track the vehicles according to an embodiment of the present invention.

FIGS. 4 and 5 illustrate embodiments of the flow of data that a user using a device 11 or 22 submits to system computer 12 in setting up mobile geofence 17 for any particular jobsite or asset. FIG. 5 describes how GPS data is received and recorded in one embodiment of the present invention. In step 60, a user powers on first mobile communication device 11 having a GPS receiver and places it in a mobile asset, for example, loader 20. In step 61, the user logs into the application on mobile communication device 11 and, in step 62, receives a list 53 of possible vehicles at the worksite (e.g., loaders 20 and trucks 40) from remote database 14. In step 63, the user selects from the available vehicles the one in which the user's mobile communication device 11 is in, thereby submitting asset identification data 54 through network 13 to system computer 12. In step 64, mobile communication device 11 receives geolocation signal 16 and uses it to determine geolocation data 51 for its particular geolocation, and communicates geolocation data 51 through network 13 to computer 12 which stores it in database 14. If a mobile geofence 17 is intended to bound to that particular mobile communication device 11, system 12 updates each geolocation datapoint forming mobile geofence 17 according to each change in geolocation data 51. Assuming geolocation signals 16 are being received and network 13 is operating, a dataset of geolocation data 51 for the user's particular mobile communication device 11 is developed in database 14. If a mobile geofence 17 is not intended to be bound to that particular mobile communication device, this application refers to that mobile communication device as second mobile communication device 22, and in step 64, it will submit through network 13 its geolocation data 52 that will be received by computer 12 in order to track the cycle time of second mobile communication device 22. From data 51 and/or 52, a detailed description of each leg of the travels of the mobile communication devices 11 and 22, presumably disposed in mobile assets, can be stored in database 14 and utilized for precise productivity calculations and management, for example, time, number of assets, locations, and movements.

Note that not all of the steps described in FIG. 5 and the previous paragraph need be performed in all embodiments of the present invention. For example, step 62 is not performed if communication device 11 or 22 is actually already paired to an asset in the list of assets for a worksite in database 14. In some embodiments, step 62 need only be performed if the asset in which the communication device 11 or 22 is disposed has yet to be paired or is in need of being paired again.

Sometimes geolocation data 51 and/or 52 is wildly inaccurate. Reasons for these inaccuracies include disruption of GPS signal 16 due to interruption in the line of sight from physical objects such as trees or buildings, an insufficient number of satellites 15 for triangulation, multi-path error due to satellite signals 16 bouncing off nearby structures, weak signal due to atmospheric conditions, and others. These inaccuracies affect the accuracy of the productivity calculations. To improve the accuracy, system computer 12 preferably filters data 51 and 52 by removing data points that are outside given parameters. For example, in one embodiment in which geolocation signals 16 are received for loader 20 every five seconds, records are removed where the location is more than twenty meters from the previous location, since it is known that loader 20 travels less than twenty meters every five seconds. Embodiments of system 10 provide the ability for a user to input a maximum speed for any asset, which data would be stored in database 14 and queried when computer 12 is determining whether geolocation data 51 and 52 needs to be filtered.

Figure 6A:
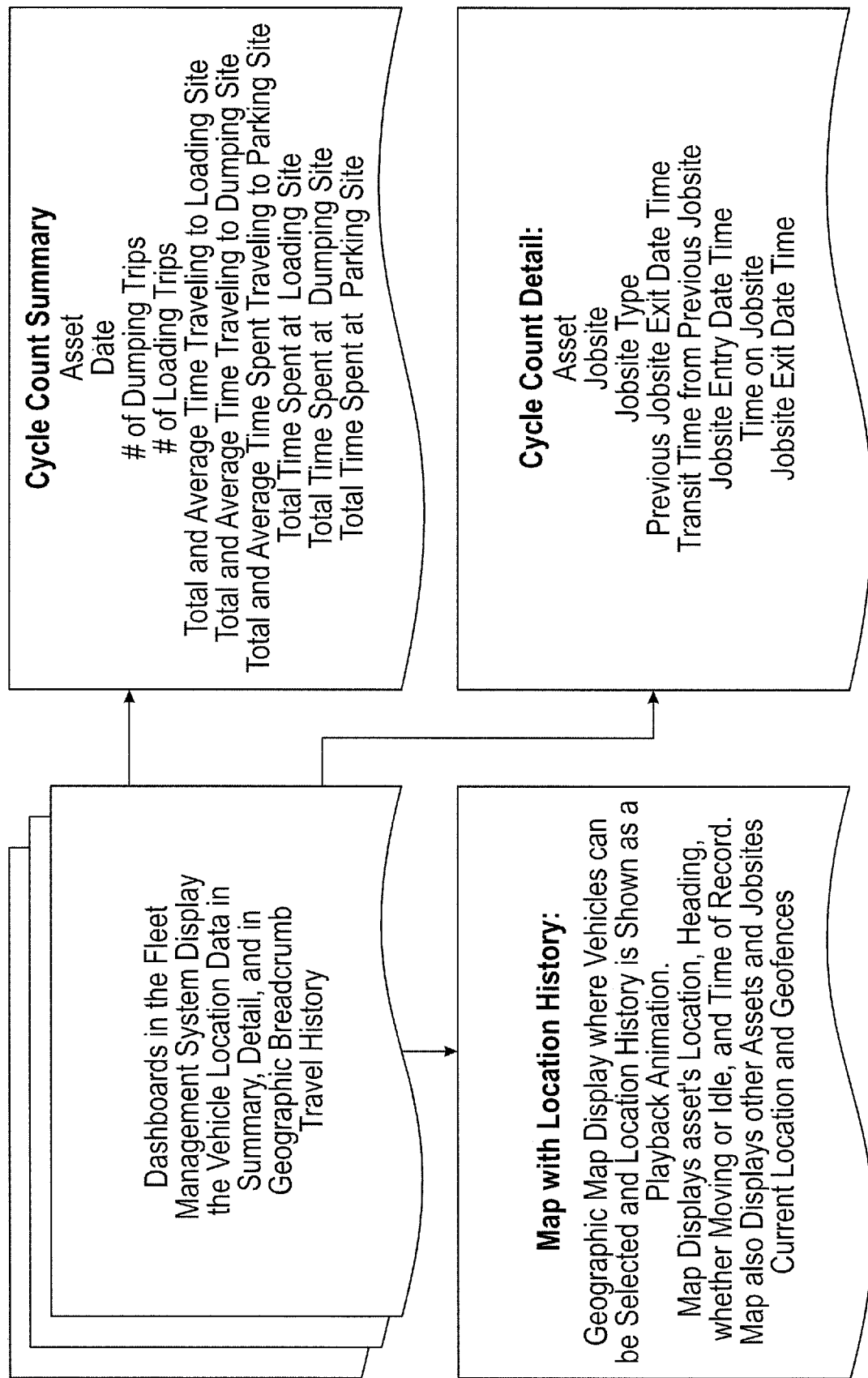
FIG. 6A is a flow chart illustrating examples of a data process as is employed on a dashboard according to an embodiment of the present invention.

The information generated by embodiments of the present invention is a tool for information management and business intelligence. The information is preferably displayed to a user in a data dashboard displayed on mobile communication device 11 and/or 22, which dashboard organizes and displays important information from multiple data sources into one place for the user to access. Referring to FIGS. 6A and 6B, a dashboard according to an embodiment of the present invention preferably displays vehicle location data in summary, detail and in geographic breadcrumb history—displaying each received GPS data point for a given vehicle—as a playback animation. System computer 12 preferably displays a geographic map of the worksite showing the assets that can be selected, for example all loaders 20 and trucks 40 at the worksite. The map preferably displays each asset's location, heading, whether moving or idle, and time of record. The map can be set up to display other assets and geofences. Note that FIGS. 6A and 6B describe various types of data in a way that might be used in a system 10 for use at a quarry, for example "Loading", "Dumping", but in other embodiments, the particular description or name of the data would be particular to that application. The particular words describing such data may be different across various embodiments. For example, a system 10 used for paving might describe such data differently than a system used at a quarry.

Cycle time is key to calculating productivity. Embodiments of the present invention calculate various components of cycle time per asset including: the number of dumping trips and loading trips; total and average time traveling to the loading site, to the dumping site, to the parking site; total and average time at the loading site, at the dumping site, and at the parking site. The data can be displayed on communication device 11 and/or 22 in charts and tables. One such table is illustrated in FIG. 6B.

Preferably, system 10 also displays on communication device 11 and/or 22 a summary report that provides a user with aggregate figures on the number of trips made by assets, the types of trips based on the target jobsite, the average duration of trips, and the average duration of time on sites while the asset and operator were on shift. A detailed report preferably provides a full asset location history and records of when the asset entered and exited worksites, the duration on the worksite, the duration spent in transit to that worksite, whether the operator of the asset was on shift during those events, and when the operator started and ended the shift.

Associating mobile geofence 17 with a mobile asset as described herein optimizes dispatching to get the right material to the right location at the right time. It can reduce waiting time of trucks 40 and still time of loaders 20, preventing them waiting in a long line to dump or load material. Fleet managers or users can view how many trucks 40 are available, as opposed to how many trucks 40 are within a static geofence of a staging area, and dispatch or redirect trucks 40 as needed. For paving or pipelaying worksites, if multiple trucks 40 are waiting at one loader 20, the company's fleet manager can redirect the operator of a truck 40 by looking at a map displayed on the user's mobile communication device 11 or 22 displaying all the jobsites of the worksite vehicles and redirect the driver to the correct loader 20. In this way, system 10 enables trucks 40 to bring their materials, for example the paver or pipelaying materials, at the right time, without waiting, to ensure those pavers and pipelaying machines do not run out of material. The movable jobsite feature will also send alerts if there are too many or too few trucks 40 at a loader 20 or paver. System 10 preferably permits the user to set criteria about how many trucks 40 and how long the trucks have been sitting there to trigger the alerts they need.

Optionally, embodiments of the present invention can include a general or specific purpose computer or distributed system programmed with computer software implementing steps described above, which computer software may be in any appropriate computer language, including but not limited to C++, FORTRAN, BASIC, Java, Python, Linux, assembly language, microcode, distributed programming languages, etc. The apparatus may also include a plurality of such computers/distributed systems (e.g., connected over the Internet and/or one or more intranets) in a variety of hardware implementations. For example, data processing can be performed by an appropriately programmed microprocessor, computing cloud, Application Specific Integrated Circuit (ASIC), Field Programmable Gate Array (FPGA), or the like, in conjunction with appropriate memory, network, and bus elements. One or more processors and/or microcontrollers can operate via instructions of the computer code and the software is preferably stored on one or more tangible non-transitive memory-storage devices. All computer software disclosed herein may be embodied on any non-transitory computer-readable medium (including combinations of mediums), including without limitation CD-ROMs, DVD-ROMs, hard drives (local or network storage device), USB keys, other removable drives, ROM, and firmware.

The terms "about" or "approximately" as used herein, mean an acceptable error for an articular recited value, which depends in part on how the value is measured or determined. In certain embodiments, "about" can mean one or more standard deviations. When the antecedent term "about" is applied to a recited range or value it denotes an approximation within the deviation in the range or value known or expected in the art from the measurement method. For removal of doubt, it should be understood that any range stated in this written description that does not specifically recite the term "about" before the range or before any value within the stated range inherently includes such term to encompass the approximation within the deviation noted above.

Embodiments of the present invention can include every combination of features that are disclosed herein independently from each other. Although the invention has been described in detail with particular reference to the disclosed embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference. Unless specifically stated as being "essential" above, none of the various components or the interrelationship thereof are essential to the operation of the invention. Rather, desirable results can be achieved by substituting various components and/or reconfiguration of their relationships with one another.

What is claimed is:

1. A system for managing assets at a worksite, the system comprising:
    a system computer device in communication with a database;
    a first communication device capable of being disposed on or in a first mobile asset, the first communication device comprising:
        a receiver of geolocation signals, and
        at least one computer processor and at least one memory resource storing instructions that, when executed by the at least one computer processor causes the first communication device to generate geolocation data related to its geolocation based on the geolocation signals, and to communicate the geolocation data over a network to the system computer device;
    a second communication device capable of being disposed on or in a second mobile asset, the second communication device comprising:
        a receiver of geolocation signals, and
        at least one computer processor and at least one memory resource storing instructions that, when executed by the at least one computer processor causes the second communication device to generate geolocation data related to its geolocation based on the geolocation signals, and to communicate the geolocation data over the network to the system computer device; and
    wherein the system computer device comprises at least one computer processor and at least one memory resource storing instructions that, when executed by the at least one computer processor:
    receives the geolocation data from the first and second communication devices over a network and stores the geolocation data in the database, and
        stores in the database at least one datapoint of geolocation data representing a mobile geofence, wherein the mobile geofence relates to the geolocation data of the first communication device;
        stores in the database at least one datapoint of geolocation data representing a second geofence;
    wherein the system computer device determines a cycle time of the second communication device by determining an amount of time that passes between when the mobile geofence is triggered by the second communication device and when the second geofence is subsequently triggered by the second communication device, wherein the mobile geofence or second geofence is triggered by at least one of the conditions selected from the group consisting of: (1) the geolocation of the second communication device is same as the geolocation of at least one of the datapoints of the mobile geofence or second geofence; (2) the geolocation of the second communication device is between at least two of the datapoints of the mobile geofence or second geofence; and (3) the geolocation of the second communication device is within a preset distance of a datapoint of the mobile geofence or second geofence.

2. The system of claim 1, wherein the system computer device periodically updates the at least one datapoint of the mobile geofence based on the geolocation data of the first communication device disposed on or in the first mobile asset.

3. The system of claim 2, wherein the update by the system computer device comprises changing each datapoint of the mobile geofence proportionally with a change in the geolocation data of the first communication device, in same direction as the change in the geolocation data of the first communication device.

4. The system of claim 1, wherein the at least one datapoint of geolocation data representing the mobile geofence is a set of datapoints that, when the datapoints are connected by a continuous line, forms a closed shape that starts and ends at a same datapoint.

5. The system of claim 4, wherein the system computer device is preset to maintain the datapoints of the mobile geofence such that the geolocation of the first communication device is outside the closed shape of the mobile geofence.

6. The system of claim 1, wherein the at least one datapoint of geolocation data representing the mobile geofence is a set of datapoints that, when the datapoints are connected by a line, forms a shape comprising a series of straight line segments.

7. The system of claim 1, wherein the at least one datapoint of geolocation data representing the mobile geofence is a set of datapoints that, when the datapoints are connected by a line, forms a shape that is a polygon.

8. The system of claim 1, wherein the system computer device periodically updates the at least one datapoint of the mobile geofence based on orientation data of the first communication device disposed on or in the first mobile asset, wherein the orientation data comprises information generated by an accelerometer, magnetic sensor and/or a power take-off sensor disposed on or in the first communication device.

9. The system of claim 1, wherein geolocation of the at least one datapoint of the mobile geofence is at least a distance from the first mobile communication device that is greater than a dimension of the first mobile asset.

10. The system of claim 1, wherein geolocation of the at least one datapoint of the mobile geofence is less than a distance from the first mobile communication device that is a dimension of the second mobile asset.

11. The system of claim 1, wherein the second geofence relates to geolocation data of either a static geolocation or a third mobile asset.

12. A method for managing assets at a worksite, the method being performed by one or more computer processors, the method comprising:
    generating geolocation data related to the geolocation of a first and second communication device, the first communication device capable of being disposed on or in a first mobile asset and the second communication device capable of being disposed on or in a second mobile asset;

receiving, over a network, the geolocation data and storing the geolocation data in a database;

storing in the database at least one datapoint of geolocation data representing a mobile geofence, wherein the mobile geofence relates to the geolocation data of the first communication device;

storing in the database at least one datapoint of geolocation data representing a second geofence;

determining a cycle time of the second communication device by determining an amount of time that passes between when the mobile geofence is triggered by the second communication device and when the second geofence is subsequently triggered by the second communication device, wherein the mobile geofence or second geofence is triggered by at least one of the conditions selected from the group consisting of: (1) the geolocation of the second communication device is same as the geolocation of at least one of the datapoints of the mobile geofence or second geofence; (2) the geolocation of the second communication device is between at least two of the datapoints of the mobile geofence or second geofence; and (3) the geolocation of the second communication device is within a preset distance of a datapoint of the mobile geofence or second geofence.

13. The method of claim 12, further comprising updating the at least one datapoint of the mobile geofence based on the geolocation data of the first communication device disposed on or in the first mobile asset.

14. The method of claim 13, wherein updating the at least one datapoint of the mobile geofence comprises changing each datapoint of the mobile geofence proportionally with a change in the geolocation data of the first communication device, in same direction as the change in the geolocation data of the first communication device.

15. The method of claim 12, wherein the at least one datapoint of geolocation data representing the mobile geofence is a set of datapoints that, when the datapoints are connected by a continuous line, forms a shape that is a polygon.

16. The method of claim 12, further comprising periodically updating the at least one datapoint of the mobile geofence based on orientation data of the first communication device disposed on or in the first mobile asset, wherein the orientation data comprises information determined based on information generated by an accelerometer, magnetic sensor and/or power take-off sensor disposed on or in the first communication device.

17. The method of claim 12, wherein geolocation of the at least one datapoint of the mobile geofence is less than a distance from the first mobile communication device that is a dimension of the second mobile asset.

18. The method of claim 12, wherein the second geofence relates to geolocation data of either a static geolocation or a third mobile asset.

19. A non-transitory computer-readable medium that stores instructions, executable by one or more processors, to cause the one or more processors to perform operations that comprise:

generating geolocation data related to the geolocation of a first and second communication device, the first communication device capable of being disposed on or in a first mobile asset and the second communication device capable of being disposed on or in a second mobile asset;

receiving, over a network, the geolocation data and storing the geolocation data in a database;

storing in the database at least one datapoint of geolocation data representing a mobile geofence, wherein the mobile geofence relates to the geolocation data of the first communication device, and wherein the at least one datapoint of geolocation data representing the mobile geofence is a set of datapoints that, when the datapoints are connected by a continuous line, forms a shape that is a polygon;

updating the at least one datapoint of the mobile geofence based on the geolocation data of the first communication device disposed on or in the first mobile asset by changing each datapoint of the mobile geofence proportionally with a change in the geolocation data of the first communication device, in the same direction as the change in the geolocation data of the first communication device;

storing in the database at least one datapoint of geolocation data representing a second geofence; and determining a cycle time of the second communication device by determining an amount of time that passes between when the mobile geofence is triggered by the second communication device and when the second geofence is subsequently triggered by the second communication device, wherein the mobile geofence or second geofence is triggered by at least one of the conditions selected from the group consisting of: (1) the geolocation of the second communication device is same as the geolocation of at least one of the datapoints of the mobile geofence or second geofence; (2) the geolocation of the second communication device is between at least two of the datapoints of the mobile geofence or second geofence; and (3) the geolocation of the second communication device is within a preset distance of a datapoint of the mobile geofence or second geofence.

20. The non-transitory computer-readable medium of claim 19, wherein the second geofence relates to geolocation data of either a static geolocation or a third mobile asset.

* * * * *

UNITED STATES PATENT AND TRADEMARK OFFICE
CERTIFICATE OF CORRECTION

PATENT NO. : 11,297,462 B2
APPLICATION NO. : 17/038405
DATED : April 5, 2022
INVENTOR(S) : Dale Hanna and Daniel Schaefer It is certified that error appears in the above-identified patent and that said Letters Patent is hereby corrected as shown below:

In the Claims

Column 19, Lines 50-52, Claim 1: the text of "receives the geolocation data from the first and second communication devices over a network and stores the geolocation data in the database, and" should be indented to align with the two subsequent strings of text that begin with "stores".

Column 21, Lines 1-8, Claim 12: the text of "receiving, over a network, the geolocation data and storing the geolocation data in a database;" AND the text of "storing in the database at least one datapoint of geolocation data representing a mobile geofence, wherein the mobile geofence relates to the geolocation data of the first communication device;" AND the text of "storing in the database at least one datapoint of geolocation data representing a second geofence;" should be outdented to align with the subsequent string of text that begins with "determining".

Column 21, Line 8, Claim 12: the word "and" should be added after "second geofence;".

Signed and Sealed this
Fourth Day of October, 2022

Katherine Kelly Vidal
*Director of the United States Patent and Trademark Office*